United States Patent [19]
Perry

[11] Patent Number: 5,993,217
[45] Date of Patent: *Nov. 30, 1999

[54] LEARNING APPARATUS

[76] Inventor: Albert William Perry, 1836 Feltham Road, Victoria, B.C., Canada, V8N 2A6

[*] Notice: This patent is subject to a terminal disclaimer.

[21] Appl. No.: 09/015,273

[22] Filed: Jan. 29, 1998

Related U.S. Application Data

[63] Continuation-in-part of application No. 08/798,629, Feb. 11, 1997, Pat. No. 5,725,379.

[51] Int. Cl.[6] .................................................. G09B 21/00
[52] U.S. Cl. ......................... 434/113; 434/112; 434/116; 434/167; 434/169; 434/171; 434/175; 704/258
[58] Field of Search .................................... 434/113, 112, 434/116, 167, 169, 171, 175; 704/258; 234/69; 116/18

[56] References Cited

U.S. PATENT DOCUMENTS

| | | | |
|---|---|---|---|
| 2,978,171 | 4/1961 | Candell | 234/16 |
| 3,307,274 | 3/1967 | Glaser . | |
| 3,748,748 | 7/1973 | Bevan et al. . | |
| 3,784,763 | 1/1974 | Budrose | 360/2 |
| 3,795,063 | 3/1974 | Nelson | 434/343 |
| 3,798,792 | 3/1974 | Askew | 434/343 |
| 3,893,182 | 7/1975 | Schmidt | 360/88 |
| 3,925,779 | 12/1975 | Gerstenhaber | 434/112 |
| 4,000,565 | 1/1977 | Overby et al. | 434/116 |
| 4,027,405 | 6/1977 | Schloss | 434/312 |
| 4,215,813 | 8/1980 | Hill et al. | 235/448 |
| 4,465,465 | 8/1984 | Nelson | 434/112 |
| 4,505,682 | 3/1985 | Thompson | 434/335 |
| 4,639,225 | 1/1987 | Washizuka | 434/308 |
| 4,731,027 | 3/1988 | Phinney | 434/348 |
| 4,791,741 | 12/1988 | Kondo | 704/272 |
| 5,001,696 | 3/1991 | Baldwin | 364/521 |
| 5,177,800 | 1/1993 | Coats | 381/51 |
| 5,511,980 | 4/1996 | Wood | 434/169 |
| 5,687,221 | 11/1997 | Oheda et al. | 379/96 |
| 5,725,379 | 3/1998 | Perry | 434/113 |
| 5,736,978 | 4/1998 | Hasser et al. | 345/173 |
| 5,769,423 | 6/1998 | Walker | 273/287 |
| 5,813,861 | 9/1998 | Wood | 434/169 |
| 5,847,697 | 12/1998 | Sugimoto | 345/168 |
| 5,851,119 | 12/1998 | Sharpe, III et al. | 434/317 |

FOREIGN PATENT DOCUMENTS 2201025  8/1988  United Kingdom .

Primary Examiner—Jessica J. Harrison
Assistant Examiner—David A. Fleming
Attorney, Agent, or Firm—Jeffrey T. Daines; Barrigar & Moss

[57] ABSTRACT

A learning apparatus for use with a computer comprising a set of tactile flash cards, each individual card having a tactilely perceptible pattern embossed on a surface of the card and two electrically connected contacts at a unique set of discrete spaced positions on the card with a preselected correspondence between the tactilely perceptible pattern on the surface of the card and the selected positions of the contacts, and a tactile flash card reader capable of sensing the positions of the contacts on a card and controlling the computer.

27 Claims, 5 Drawing Sheets

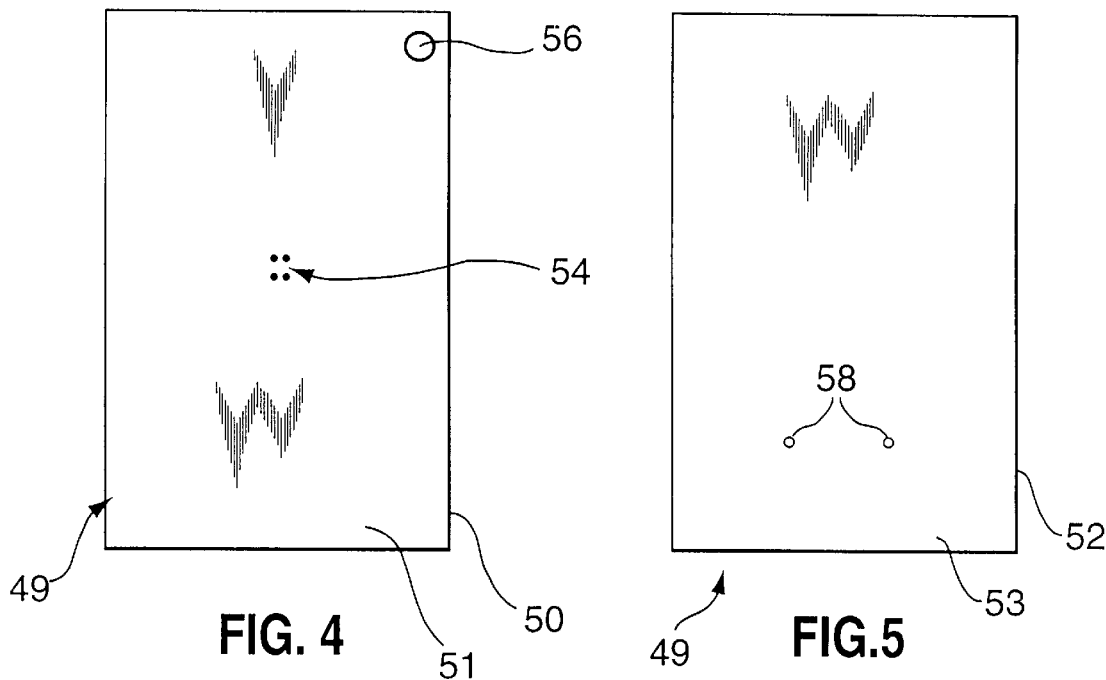
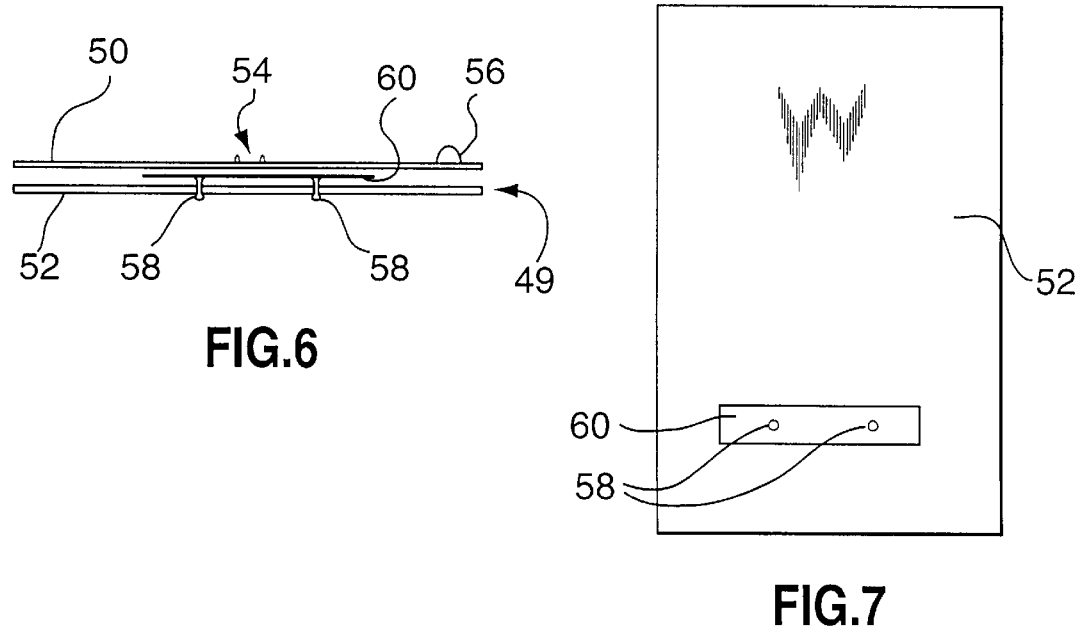

LEARNING APPARATUS

RELATED APPLICATION

This application is a continuation-in-part of U.S. application Ser. No. 08/798,629 filed on Feb. 11, 1997, now U.S. Pat. No. 5,725,379.

FIELD OF THE INVENTION

This invention relates primarily to the field of devices designed to assist the blind or nearly blind in learning braille by speaking, sounding, or displaying in enlarged form a letter, number, word, phrase, or musical note corresponding to a pattern of braille dots embossed upon a tactile flash card.

BACKGROUND OF THE INVENTION

Braille is a tactile system using raised dots to represent the letters of the alphabet, numerals, punctuation marks, or musical notes for persons with severe visual impairment. Each letter of the alphabet, numeral, punctuation mark, or musical note is formed from raised dots arranged within a cell (a "braille cell") having three rows and two columns. Braille is read by moving the fingers gently over the surface which has been embossed with the braille dots.

There are many available devices to aid persons who know braille in using braille, but few devices to help the blind and those with failing vision to learn braille. This is unfortunate, as braille literacy can expand the world for persons having severe visual impairment.

Typically braille is taught by a teacher working with one student at a time. The teacher may present material written in braille to the student, who then attempts to read it correctly. The teacher is available to provide feedback as to the correctness of the student's reading of the braille. Self-study is difficult for a blind person as immediate feedback is normally not possible. The blind student cannot easily check his or her work.

The prior art of which the inventor is aware includes braille learning aids that use tactile flash cards with embedded magnetic tape read in a manner similar to that used in an audio tape player. For example, in Schloss, U.S. Pat. No. 4,027,405, a tape read head is moved past a length of magnetic tape embedded in a tactile flash card. To hear the letter or word corresponding to the braille embossed on the face of the card spoken the student places the card on the reader. The tape read head then moves past the embedded tape picking up the recording of the material corresponding to the braille. Devices such as that disclosed in Schloss contain moving parts and hence would be susceptible to damage by young students learning on their own.

An apparatus for learning braille capable of being operated independently by a person having little or no vision is highly desirable, particularly for unaided home study. Such an apparatus should be simple to use (for example, requiring minimal or no computer operating or keyboarding skills) and either be inexpensive or use readily available technology such as a personal computer with a sound card. Further, such an apparatus should be flexible enough to allow easy revision of both (1) the particular braille characters, words, or sentences being taught and (2) the voice reading the braille to be changed to either another person's voice or to a sound. For example, the word "bird" might be spoken and the sound of a bird played when a card having the braille for "bird" is read by the system.

SUMMARY OF THE INVENTION

The present invention is directed in one aspect to providing a braille learning apparatus for use with a computer having a keyboard port and that is capable under program control of sound generation, visual display of graphics, or both sound generation and visual display of graphics. The braille learning apparatus is comprised of a housing in which is mounted a grid board having a card-receiving surface with a multiplicity of discrete pairs of electrically conducting contacts. At least one removable card having a periphery mating with that of the card-receiving surface and having a front and a back surface is provided. Normally, there would be provided a set of such cards, each corresponding to a unique braille character or group of characters.

Each card has (1) a pattern of braille dots embossed upon its front surface, (2) means for tactilely identifying a preselected orientation of the card for positioning the card in mating contact with the card-receiving surface, and (3) a pair of electrically connected conducting contacts protruding from the card's back surface at preselected positions corresponding to the positions of a selected one of the discrete pairs of the electrically conducting contacts on the card-receiving surface of the grid board. If a card is positioned with back surface of the card in mating contact with the card-receiving surface in the preselected orientation, then the selected pair of electrically conducting contacts on the card-receiving surface of the grid board is electrically connected together.

The grid board is mounted to the housing so that the card may be placed, on the basis of tactile information only, upon the grid board with the back surface of the card in mating contact with the card-receiving surface in the preselected orientation. Also mounted in the housing is a keyboard encoder having an output port for connection by cable of the keyboard encoder to the keyboard port of the computer.

The keyboard encoder is electrically connected to the grid board contacts so as to send a keystroke signal to the keyboard port of the computer in response to the electrical connection together of a pair of grid board contacts, said keystroke signal determined by location of the pair of electrically connected contacts. Also mounted to the housing are momentary switches electrically connected to the keyboard encoder so that operation of each momentary switch causes a discrete keystroke to be sent to the keyboard port of the computer.

Optionally, software for use with a computer capable of sound generation under program control is provided for operating the computer so that the computer generates preselected sound for each discrete keystroke signal received at the keyboard port. The sound may be selected to correspond to the pattern of braille dots on a card placed in mating contact with the card-receiving surface in the preselected orientation. The loading, starting, and terminating of the operation of the computer may be controlled by operation of preselected combinations of the momentary switches or by use of the computer keyboard.

Optionally, the sound generated by the computer may be selected to be the spoken equivalent of the pattern of braille dots on the card. Another option is for the spoken equivalent generated by the computer to be generated from digitized recorded human speech.

Optionally, software for use with a computer capable of visual display of graphics capable under program control is provided for displaying a preselected graphic representation of the pattern of braille dots embossed upon the card.

Optionally, an embossed figure or raised design may be provided upon the front surface of the card in addition to the pattern of braille dots, the figure or design being meaningfully related to the pattern of braille dots, or the front surface may be provided only with an embossed figure or raised design.

In another aspect the present invention is directed to providing a set of cards for learning braille comprising a plurality of individual cards. Each individual card has a pattern of braille dots embossed on a surface of the card and two electrically connected contacts at a unique set of discrete spaced positions on the card, with a preselected correspondence between the pattern of braille dots on the surface of the card and the selected positions of the contacts. The set of cards may be used in an apparatus having means for storing data representing the correspondences between the pattern of braille dots on the surface and the positions of the contacts on each individual card, position sensing means for sensing the positions of the contacts on a card, and means for producing a distinct sound in response to the positions of the contacts on a card based upon the stored data representing the correspondences. Each distinct sound is uniquely correlated with a selected one set of the positions of the contacts.

BRIEF DESCRIPTION OF THE DRAWINGS

FIG. 4 is a front view of a preferred embodiment of a card for use with the card reader of FIG. 1.

FIG. 5 is a back view of the card of FIG. 4.

FIG. 6 is a bottom elevation view of elements of a preferred embodiment of the card of FIG. 4 partially exploded.

FIG. 7 is a front view of a preferred embodiment of the back panel of the card of FIG. 4.

DETAILED DESCRIPTION OF THE PREFERRED EMBODIMENT

Figure 1:
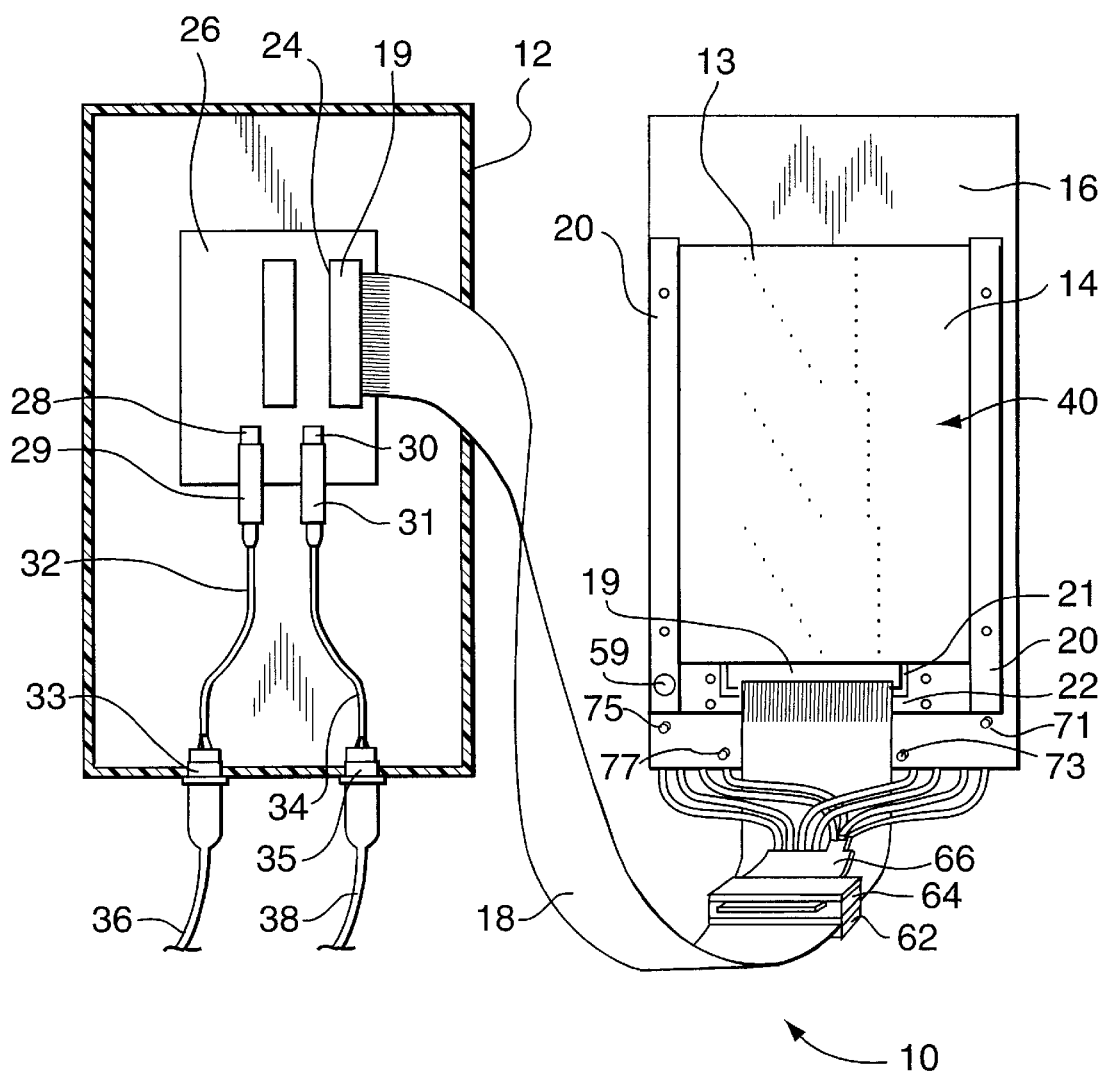
FIG. 1 is an overall schematic plan view of a preferred embodiment of the card reader of a braille learning apparatus in accordance with the invention with the grid board mounting plate lifted out of the housing to reveal the keyboard encoder.

The preferred embodiment of the invention is comprised of a reader, generally indicated by numeral 10 in FIG. 1, a set of tactile flash cards, each having a pattern of braille dots embossed upon one surface, a representative example of which card is illustrated in FIGS. 4–7 and generally indicated by numeral 49, and software for use with an IBM or compatible personal computer (not shown) and having a standard PC keyboard port and a Sound Blaster (TM) or a compatible sound card with associated driver software and having speakers or headphones. Attached to the end of the description of the preferred embodiment are two example program listings of the software.

The reader 10 is comprised of a housing 12, which may be a tool box type of container, in which is mounted a keyboard encoder 26. The preferred keyboard encoder 26 is a KE18 PC Keyboard Encoder made by Hagstrom Electronics, 2 Green Lantern Blvd., Endicott, N.Y. 13760. The encoder 26 has an output port 28 for connection to the keyboard port of an IBM or compatible personal computer and a pass-through port 30 for connection to a standard PC keyboard. Each of ports 28/30 is a five pin DIN-type female connector. The keyboard encoder 26 receives power for its operation from the keyboard port of an IBM or compatible personal computer to which it is connected.

In addition to its function as a keyboard encoder as described below, the keyboard encoder 26 will pass a keystroke signal sent from a standard PC keyboard (not shown) connected to the pass-through port 30 through to an IBM or compatible personal computer (not shown) connected to the output port 28. This functionality may be used for starting and stopping a software running on the computer if the user of the software is able to use a keyboard, switching from the running of one software program to another, and testing of software.

The keyboard encoder 26 also provides a 2×20 pin input header 24 (not visible in FIG. 1) to receive a 40 wire ribbon cable plug 19. Input header 24 provides two grounded pairs of pins labelled G on the keyboard encoder 26, nine pairs of column pins labelled C1 through C9 on the keyboard encoder 26, and nine pairs of row pins labelled R1 through R9 on the keyboard encoder 26 with the pins of each discrete pair of pins electrically connected together. The keyboard encoder 26 may be used in either a 9×9 matrix scan mode or an 18 input mode. In the preferred embodiment of the invention the 9×9 matrix scan mode is used. In this mode, the keyboard encoder 26 produces a keystroke signal at the output port 28 in response to the shorting of one pair of row pins of the input header 24 to one pair of column pins of the input header 24. As there are nine pairs of row pins and nine pairs of column pins, the maximum number of discrete keystroke signals that can be generated by the keyboard encoder 26 operating in this mode is 81. The following combinations of pins on the keyboard encoder 26 are used in the preferred embodiment to produce the keystrokes indicated below:

| Keystroke | Column/Row Combination |
|---|---|
| A | C1/R1 |
| B | C1/R2 |
| C | C1/R3 |
| D | C1/R4 |
| E | C1/R5 |
| F | C1/R6 |
| G | C1/R7 |
| H | C1/R8 |
| I | C1/R9 |
| J | C2/R1 |
| K | C2/R2 |
| L | C2/R3 |
| M | C2/R4 |
| N | C2/R5 |
| O | C2/R6 |
| P | C2/R7 |
| Q | C2/R8 |
| R | C2/R9 |
| S | C3/R1 |
| T | C3/R2 |
| U | C3/R3 |
| V | C3/R4 |
| W | C3/R5 |
| X | C3/R6 |
| Y | C3/R7 |
| Z | C3/R8 |
| Esc | C3/R9 |
| Enter | C7/R4 |

The reader 10 is also provided with two female DIN type sockets 33/35 each having a ground terminal and five signal terminals and mounted through a wall of the housing 12 and two cables 32/34, each cable 32/34 ends in a DIN type male connector 29/31. The end of cable 32 not ending in connector 29 is connected to socket 33 with soldered individual connections of the conductors of cable 32 to the appropriate terminals of socket 33. Male connector 29 may then be plugged into output port 28. A computer connection cable 36 may then be connected to output port 28 by plugging it into socket 33. Similarly, cable 34 is connected to socket 35 with soldered individual connections of the conductors of cable 34 to the appropriate terminals of socket 35. A keyboard connection cable 38 may then be electrically connected to pass-through port 30 by plugging it into socket 35. The interposition of sockets 33/35 and cables 32/34 between the connection cables 36/38 and ports 28/30 tends to protect the keyboard encoder 26 from mechanical damage that might be caused by repeated connection and disconnection of computer connection cable 36 and keyboard connection cable 38 directly to and from output port 28 and pass-through port 30, respectively.

Figure 3:
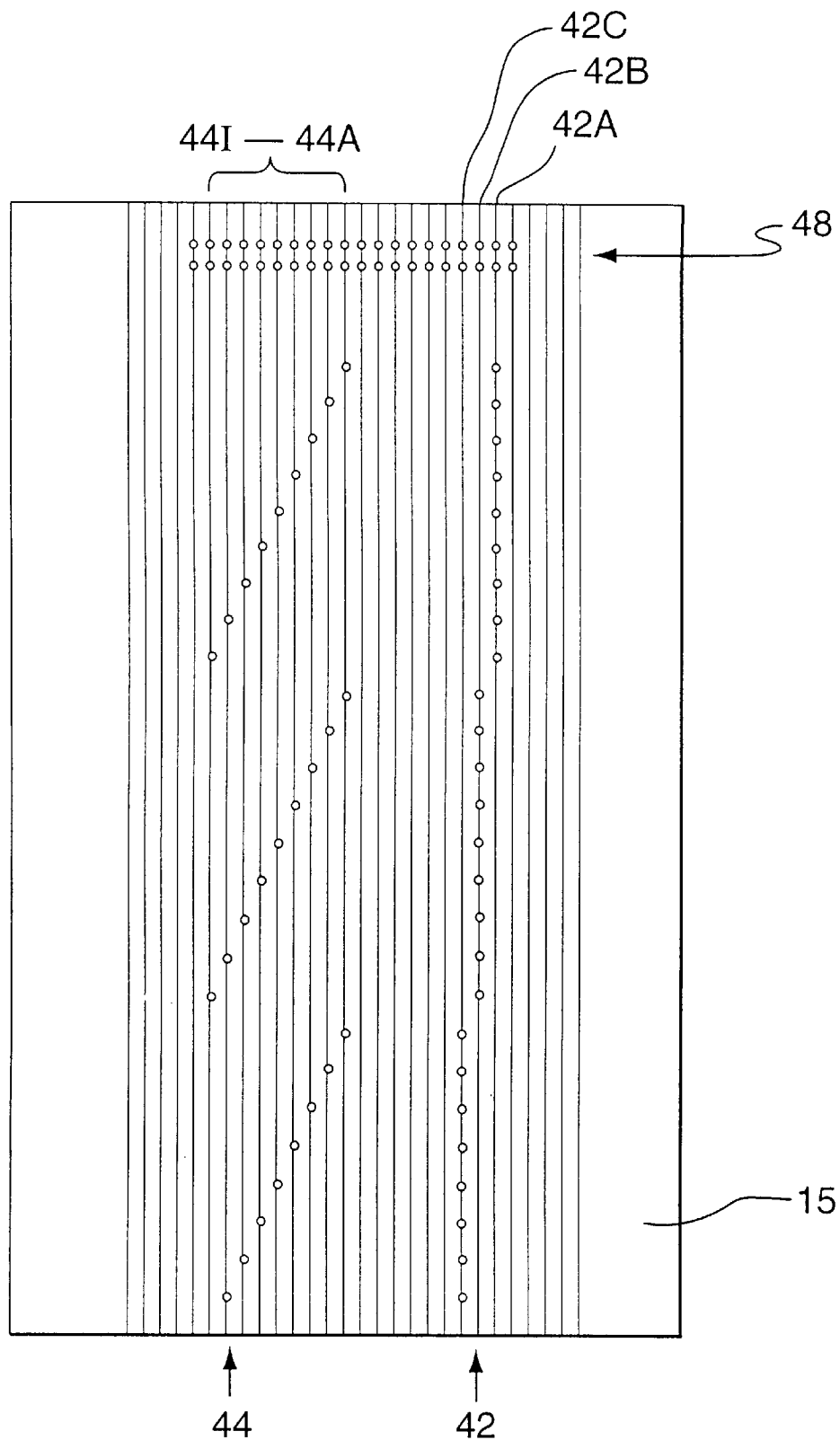
FIG. 3 is a schematic bottom view of a preferred embodiment of the grid board of FIG. 2.

A grid board 13 having a card-receiving top surface 14 and a bottom surface 15 illustrated schematically in FIG. 3 is attached to mounting plate 16 made from plastic sheet material. In the preferred embodiment a 100 mm×160 mm pre-etched perforated grid board made by Vero Electronics and bearing part number 07 0008 is used for grid board 13. The mounting plate 16 with attached grid board 13 is removably mounted in the housing 12. In FIG. 1, mounting plate 16 with the attached grid board 13 has been removed from the housing 12 to expose the keyboard encoder 26. If a tool box has been used for the housing 12, then mounting plate 16 may replace the shelf of the box. Raised plastic side borders 20 and top border 22 are bolted or glued to the mounting plate 16. The top border 22 has an cutout to accommodate a 40 pin ribbon cable socket 21. The borders 20/22 are ⅜" thick and act as tactile guides to aid in the positioning of the card 49 directly over grid board 13. The top border 22 and side borders 20 are at right angles to each other and are spaced apart by the width of the cards 49. The portion of the grid board 13 between the side borders 20 and the top border 22 comprises a card-receiving surface 14 for receiving cards 49. A plastic bump 59 is provided on one of the side borders 20 to allow a blind person to determine the orientation of the card-receiving surface 14.

Figure 8:
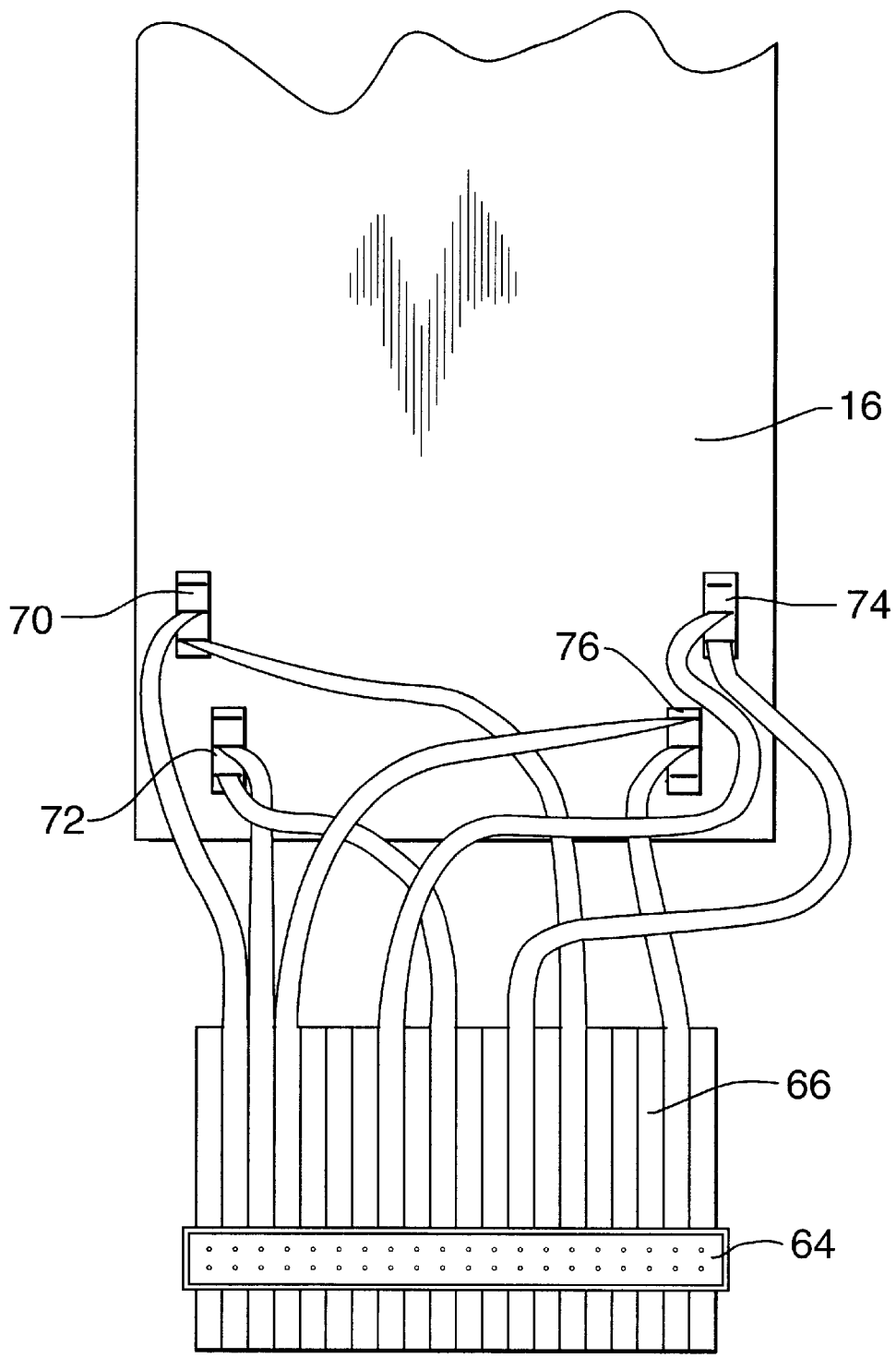
FIG. 8 is a schematic view of a portion of the card reader of FIG. 1 showing the bottom of the mounting plate and associated cable and connector.

Also mounted to the mounting plate 16 are four miniature spring-loaded momentary on toggle switches 70, 72, 74, and 76 having handles 71, 73, 75, and 77, respectively, as illustrated in FIGS. 1 and 8. Each switch is a Mode Electronics of Burnaby, B.C. part number 41-234-1, which is a SPDT switch, but a similar SPST switch would work as well. Each toggle switch handle is distinguishable from the other toggle switch handles by touch alone so as to be easily distinguishable by blind persons a well as by location on the mounting plate 16. For example, one switch handle may be left bare, whereas another may have a thin smooth rubber jacket, a third may have a thin rough rubber jacket, the fourth may have a smooth thick rubber jacket.

Figure 2:
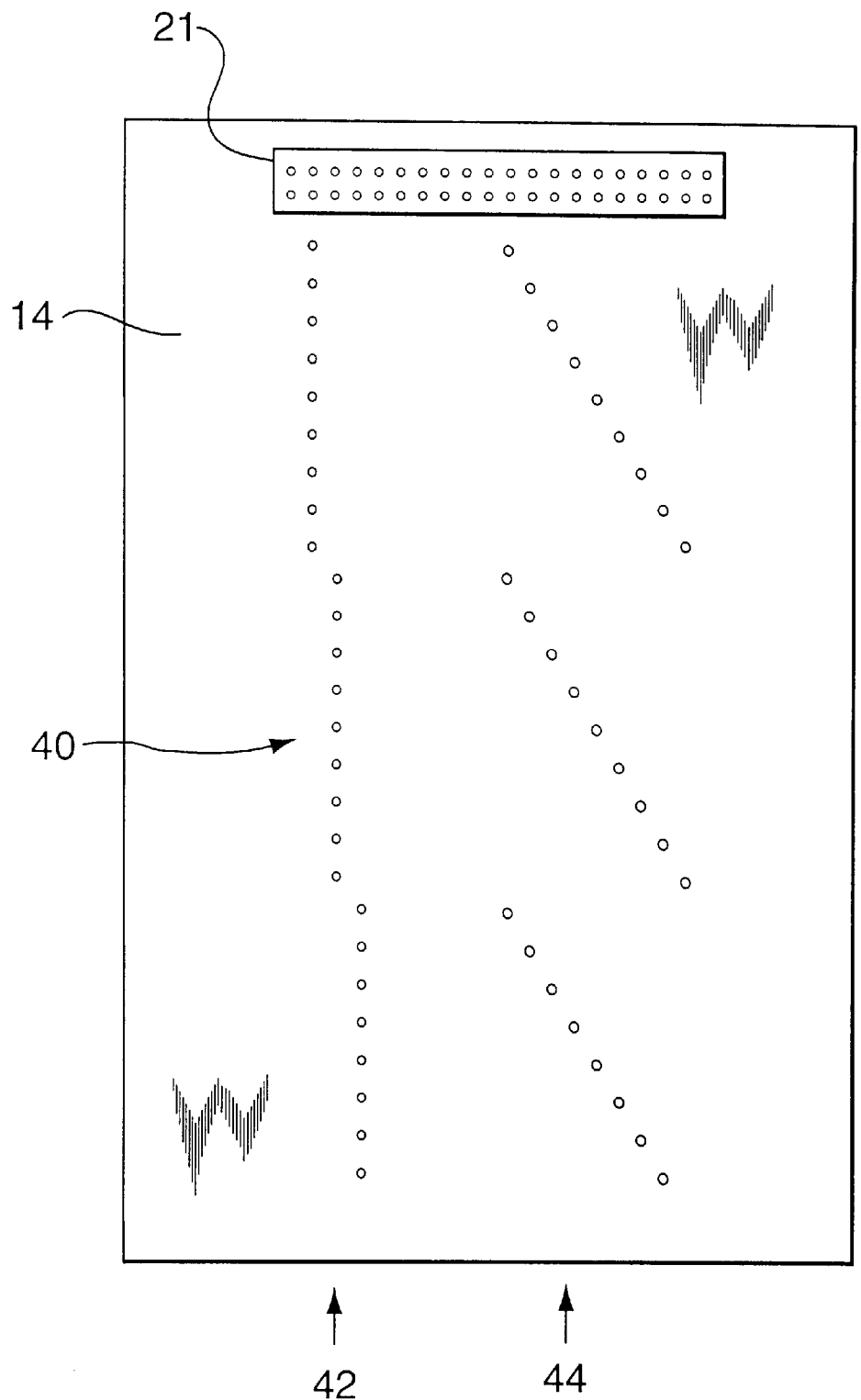
FIG. 2 is a plan view of a preferred embodiment of the grid board of the card reader of FIG. 1.

The grid board 13, illustrated in more detail in FIGS. 2 and 3, is perforated with a rectangular matrix of holes (not shown) with a spacing manufactured for circuit components such as sockets and integrated circuits. The bottom surface 15 of grid board 13 is provided with 28 common copper foil strips running the length of the circuit card 13, of which 12 are used in the preferred embodiment of the invention. In FIG. 3 each common copper foil strip is shown schematically as a line, but in fact each strip has a width of approximately 2 mm and is spaced from its neighboring strips by a spacing of approximately 1 mm. Each copper foil strip connects the holes in one row of holes of the rectangular matrix of holes that forms the perforations of the grid board 13 so that a pin of a component inserted through a hole of a row of the matrix from the card-receiving surface 14 and soldered to the copper foil strip on the bottom surface 15 penetrated by that hole is electrically connected to any other pin inserted through a hole penetrating the same strip and soldered to that strip. Specifically, in the preferred embodiment of the invention a ribbon cable socket 21 having 20 pairs of pins 48 is soldered to the grid board 13 near the top of the grid board 13 by inserting the pins 48 from the card-receiving surface 14 through holes in the grid board 13 and soldering the pins to the copper strips penetrated by those holes. The strips on the bottom surface 15 electrically connect the pins of each pair of pins 48 to anything soldered to the same strip as illustrated in FIG. 3. In the preferred embodiment 12 strips are used, three pairs 42 of column strips labelled as strips 42A, 42B, and 42C, and nine pairs 44 of row strips labelled as strips 44A, 44B, 44C, 44D, 44E, 44F, 44G, 44H, and 44I are used.

A 40 conductor ribbon cable 18 having female ribbon cable plugs 19 at each end of cable 18 and an intermediate female ribbon cable plug 62 adjacent to one end of cable 18 connects the ribbon cable socket 21 to the input header 24. For example, a IDE dual harddisk cable, such as PerfectLink (TM) brand item number TC-988, may be used. Each pair of pins of the ribbon cable socket 21 are then electrically connected to a pair of pins of the input header 24 so that one pair of pins of the input header 24 may be shorted to second pair of pins of the input header 24 by shorting the corresponding strips on the bottom surface 15 of grid board 13. Strips 42A, 42B, and 42C correspond to column pins C1, C2, and C3, respectively, of the input header 24. Similarly, strips 44A, 44B, 44C, 44D, 44E, 44F, 44G, 44H, and 44I correspond to row pins R1, R2, R3, R4, R5, R6, R7, R8, and R9 of the input header 24.

In general, the reader 10 operates to produce a keystroke signal when one of the column strips 42 is shorted to one of the row strips 44, thereby shorting of one pair of column pins C1, C2, or C3 of the input header 24 to one pair of row pins R1, R2, R3, R4, R5, R6, R7, R8, or R9 of the input header 24. To reduce that possibility of inadvertent shorting of a column strip to a row strip 26 pairs of contacts each electrically connected to a discrete row or column strip and generally indicated by numeral 40 in FIGS. 1 and 2 are provided upon the card-receiving surface 14.

The card-receiving surface 14 is composed of electrically insulating material. Each contact is a ½" 18 gauge escutcheon pin made of brass that has been inserted through a discrete one hole of the matrix of holes penetrating the grid board 13 and soldered in place to the strip on the bottom surface 15 penetrated by that hole. Each such hole is drilled out slightly to enable insertion of the escutcheon pin. The excess portion of each pin protruding from the bottom surface 15 is then removed.

The 26 pairs of contacts 40 may be used to represent the letters of the alphabet. However, numbers, words, phrases, or sounds may also be represented. As the keyboard encoder 26 can produce 81 discrete keystroke signals, the number of discrete pairs of contacts 40 can be increased to 81, but with the risk of increasing the likelihood of inadvertent shorting of a column strip to a row strip. The use of 26 pairs of contacts 40 is convenient as the most basic embodiment of the invention is a braille trainer for use by persons learning the braille representation of the alphabet. However, the correspondence between letters of the alphabet and the pairs of contacts is only one example of the uses of the invention. It has been found to be particularly useful to add contacts to allow the digits 0 through 9 to be represented as well as the letters of the alphabet.

It should be noted that the use of 26 pairs of contacts 40 as shown in FIG. 2 is more than necessary to represent the 26 letters of the alphabet as all of the contacts in a particular row strip 44 or column strip 42 are electrically connected and could be replaced by a single contact. The 26 pairs of contacts 40 shown in FIG. 2 could therefore be replaced by 12 contacts, one for each strip 42/44. The preferred embodiment described above used 26 pairs of contacts 40 for easy of understanding and construction. It will be apparent to those skilled in the art that it is within the scope of the invention to construct the card-receiving surface 13 and the cards 49 using different materials and arrangements or numbers of contacts to simplify mass-production of the apparatus embodying the present invention.

The toggle switches 70, 72, 74, and 76 may also be used to produce keystroke signals. As illustrated in FIG. 8, each toggle switch is electrically connected by a short section of 40 conductor ribbon cable 66 to a discrete pair of pins of a male ribbon cable socket 64. As illustrated in FIG. 1, socket 64 in turn connects to plug 62. The pairs of pins of socket 64 correspond to pairs of pins of ribbon cable socket 21 and, as in the case of the pins of socket 21, are electrically connected to the pairs of pins of input head 24. For example, toggle switch 70 is connected to column C1 pins and row R6 pins of the socket 64 so that operation of toggle switch 70 momentarily shorts the column C1 pins to the row R6 pins of the socket 64, in turn shorting the corresponding pins of the input header 24 causing the encoder 26 to produce the "F" keystroke. Similarly, operation of toggle switch 72 shorts the column C2 pins to the row R1 pins producing a "J" keystroke, operation of toggle switch 74 shorts the column C7 pins to the row R4 pins producing a "Enter" keystroke, and operation of toggle switch 76 shorts the column C3 pins to the row R9 pins producing a "Esc" keystroke. The result of the above arrangement is that the keystrokes "F", "J", "Enter", and "Esc" may be produced by use of the toggles switches 70, 72, 74, and 76, respectively, or by operation of a keyboard connected to the pass-through port 30. As described below, those particular keystrokes are used in the preferred embodiment to control the operation of the sample software program. A user not familiar with a keyboard may then initiate and terminate the software program without using a keyboard.

The cards 49 illustrated in FIG. 4–7 are comprised of a 4"×6" front sheet 50, which is 0.020" in thickness, and a 4"×6" back sheet 52, which is 0.040" in thickness. Both sheets 50/52 are made of high impact polystyrene. A conducting copper strip 60 having raised contacts 58 is sandwiched between sheets 50 and 52. The front sheet 50 has a pattern of braille dots 54 embossed in the center of its front side 51 and a plastic bump 56 for tactile orientation in the right upper corner of the front side 51. The pattern of braille dots 54 is imprinted from the underside of sheet 50 by using a braille "stylet" and braille lettering guide known as a "slate".

The back sheet 52 of the card 49 has the metal contacts 58 protruding from its back surface 53 through holes drilled using a drill bit designed for use with plastics. The positions of these holes is critical. They are located to match the position of a selected pair of contacts 40 on the grid board 13, in the most basic embodiment of the invention corresponding to the letter of the alphabet corresponding to the pattern of braille dots 54.

The copper strip 60 is approximately 2.5" long and ½" wide and is indented to a depth of approximately ⅛" at the locations of the two holes in the back sheet 52 of the card 49. The contacts 58 are formed from brass escutcheon pins which are pushed through from the convex side of the indentation and filled with solder to secure the pins. The excess portion of each pin is cut off and then the pins and solder are ground down flush with the copper strip. The copper strip is glued with epoxy glue to the back sheet 52 of the card 49 with the pin heads positioned through the card holes.

The front sheet 50 and back sheet 52 of a card 49 are glued together with epoxy glue with the braille impressions on the underside of the front sheet 50 filled with glue to strengthen the pattern of braille dots 54.

When a card 49 is placed on a grid board 13 the contacts 58 are brought into contact with a discrete pair of contacts 40 on the grid board corresponding to a letter of the alphabet. As the contacts 58 are electrically connected by the copper strip 60 a short is produced between one column strip 42 and one row strip 44, in turn causing a keystroke to be produced by the keyboard encoder 26. The keyboard encoder 26 is connected to the keyboard input of a computer (not shown) having sound and graphics capability.

Software supplied with the preferred embodiment of the invention and loaded on a computer connected to the encoder 26 receives the input alphabetical letter and uses this as a menu item to generate the output of a preselected sound from sound card and associated speaker or headphones and to display enlarged braille on a computer monitor for persons with residual vision. Sample source code for the software is listed in the disclosure of U.S. patent application Ser. No. 08/798,629, which is hereby incorporated by reference. If the software is loaded onto the computer and the letters "F" and "J" entered, then the program will up start with sound cues and messages to guide the user. Operation of the "Esc" key terminates operation of the program. "FJ" was used as on many makes of keyboards these two letters have raised underscores under these two letters or a raised dot in the center of the key, which may act as tactile markers for blind users. If necessary, keys may be marked with liquid plastic such as that sold for the blind under the trademark "HI MARKS". Similarly, the "Esc" key is relatively easy to locate on most keyboards as it is typically found in the upper leftmost position on the keyboard. However, many blind users are not familiar with the use of a computer keyboard. To aid such users toggle switches 70, 72, 74, and 76 are provided so that operation of switches 70, 72, and 74 in that order also starts the program, while operation of switch 76 terminates the operation of the program. The toggle switches 70, 72, 74, and 76 also allow the reader 10 to be used without a keyboard attached to the reader 10 or to the computer, an advantage if there is little space available for the keyboard. Toggle switches 70, 72, and 74 operate in the opposite direction to the direction of operation of toggle switch 76, so as to help the user avoid inadvertent termination of the program.

The software is written in Borland "C" code. The software installs a graphic environment and then uses a switch statement to channel the alphabet letter keystroke input to call on the braille dot-producing functions and to call an appropriate function to activate the sound card to generate sound output. The program is written for a computer equipped with a SoundBlaster (TM) sound card but a variety of makes of sound cards could be used with little change to the source code. In the present form the sound output is in English but output could be in any language as the source code calls on sound files recorded via a microphone.

Different versions of the SoundBlaster (TM) card can be used with the program. The software reproduced below has been written for the SoundBlaster Pro (TM) card, but modifications are available from the manufacturers of the card to accommodate different versions of the card.

The card 49 enables tactile recognition and promotes tactile intelligence as the tactile message is linked to an alphabet input that computer software can recognize.

As is readily apparent from the description above little effort is required to change the stored sound corresponding to a particular card 49. For example, rather than a pattern of braille dots 54 corresponding to single letter of the alphabet, a card 49 might have a pattern of braille dots corresponding to a contraction of a word, several words, or a sentence, or to a musical note. The software can easily be changed to generate sound from a different stored sound file so that the sound generated could be a word or a phase or a sound of appropriate pitch and duration in the case of a pattern of braille dots corresponding to a musical note rather than a letter of the alphabet. A different set of cards 49 may be used corresponding to a different stored sound file. For example, a second program listing for a program having file name "FFJJ", which displays and plays back digitized speech comprised of a word of up to seven letters, is also listed in the disclosure of U.S. patent application Ser. No. 08/798, 629. The letters "FFJJ" are used for the reasons mentioned above, namely, because on many computer keyboards there are tactile markers for the letters "F" and "J".

Card 49 may also be modified to add a tactilely perceptible pattern such as an embossed figure, raised design or identifiable texture, to the front side 51 of the card 49 in addition to the pattern of braille dots 54. Such a figure, design, or texture may be meaningfully related to the pattern of braille dots 54 and may be particularly helpful and interesting to younger users. For example, the pattern of braille dots 54 representing the word "bird" may be accompanied by a raised outline of a stylized bird (not shown) or the pattern of braille dots 54 representing the word "dog" may be accompanied by a patch of fur and appropriate sounds produced by the computer.

As is apparent from the above description, the present invention is not limited to the use of tactilely perceptible patterns, such as braille dots 54 or raised or embossed figures or designs, on the front side 51 of the card 49. The front side 51 could be made with a visually perceptible pattern in addition to or instead of a tactilely perceptible pattern and be used for teaching sighted people as well as the blind or persons who are progressively becoming blind, so that the same set of cards could be used for teaching both blind and sighted students or sets of cards having only visually perceptible patterns could be used for teaching sighted people, particularly children.

Including a visually perceptible pattern upon the front side 51 would also help sighted persons not familiar with braille in identifying particular cards and assisting users of the cards. The front side 51 could contain any tactilely or visually perceptible pattern including, for example, letters, words, colors, shapes, numbers, musical notes, drawings, photographs, or designs. For example, a card 49 displaying an arithmetic problem in both braille and in visually perceptible printed form on the front side 51 of the card 49 could cause the computer to aurally and visually provide the answer to the problem when the front side 51 is placed against the grid board 40, in the manner described. Similar cards could easily be made for teaching the pitches of musical notes or the pronunciation of difficult words. The card 49 may be used in the same manner as a conventional "flash card" having a question or problem on one side and the answer on the other side, except that the answer in the case of the card 49 may be obtained aurally or visually from the computer.

As is apparent from the description above, "pattern" or "feature", when used herein in relation to the front side 51 of a card 49, should be taken to mean any tactilely or visually identifiable characteristic or feature that may be used to distinguish one card 49 from another.

An alternative embodiment of the invention that will be apparent to those skilled in the art is to provide within the housing electronic circuitry, such as a micro-controller, necessary to carry out the functions of the keyboard encoder 26 and computer described above. The electronic circuitry would be connected to the grid board contacts 40 in place of the keyboard encoder 26 and programmed so that in response to the electrical connection together of a discrete pair of grid board contacts 40, the electronic circuitry would initiate the generation of a discrete sound pattern. Each discrete sound pattern would be selected using a preselected mapping of the identifiable feature on the front side 51 of the card 49 to a discrete pair of grid board contacts 40, so that the selected sound pattern would be produced by placement of the card 49 in mating contact with the card-receiving surface 13 in the preselected orientation.

An example in the prior art of a device that contains electronics which may be used in substitution for the keyboard encoder 26 and computer described above in relation to the preferred embodiment is a device for use by persons unable to speak known as a PARROT (TM) and sold by Zygo Industries, Inc., P.O. Box 1008, Portland, Oreg. 970207-1008. The Zygo device is comprised of a housing having on its top surface a number of push-button switches, each of which actuates the playback of a discrete recorded message. The recorded messages may be changed by speaking into a microphone connected to the device. One alternative embodiment of the present invention is to replace the set of push-button switches of Zygo-like devices with the grid board 13 and a set of cards 49, each discrete pair of grid board contacts 40 electrically connected in the place of a discrete push-button switch, but other embodiments will be apparent to those skilled in the art and, therefore, the invention is defined in the claims.

What is claimed is:

1. A learning apparatus for use with a computer, comprising:

a housing;

a grid board having a card-receiving surface with a multiplicity of discrete pairs of electrically conducting contacts; and a removable card having a periphery mating with that of the card-receiving surface and having a front and a back surface, said card having an identifiable feature on the front surface, an orientation feature for identifying a preselected orientation of the card for positioning the card in mating contact with the card-receiving surface, and a pair of electrically connected conducting contacts protruding from the back surface at preselected positions corresponding to the positions of a selected one of the discrete pairs of the electrically conducting contacts on the card-receiving surface of the grid board such that if the card is positioned with the back surface of the card in mating contact with the card-receiving surface in the preselected orientation the selected pair of electrically conducting contacts on the card-receiving surface of the grid board will be electrically connected together, the grid board mounted to the housing so that the card may be placed upon the grid board with the back surface of the card in mating contact with the card-receiving surface in the preselected orientation, and the grid board contacts connectable to the computer so that in response to the electrical connection together of a pair of grid board contacts a signal determined by location of the pair electrically connected contacts is provided to the computer.

2. The apparatus as defined in claim 1 for use with a computer having a keyboard port, additionally comprising a keyboard encoder mounted in the housing, said keyboard encoder having an output port for connection by cable of the keyboard encoder to the keyboard port of the computer and said keyboard encoder electrically connected to the grid board contacts so as to output a keystroke signal in response to electrical connection together of a pair of grid board contacts, said keystroke signal determined by location of the pair electrically connected contacts.

3. The learning apparatus as defined in claim 2 for use with a computer capable of sound generation under program control, additionally comprising software for operating the computer so that the computer generates a discrete sound pattern for each discrete keystroke signal received at the keyboard port, each discrete sound pattern selected using a preselected mapping of the identifiable feature of the card's front surface to a discrete keystroke signal, whereby the selected sound pattern is produced by placement of the card in mating contact with the card-receiving surface in the preselected orientation.

4. The learning apparatus as defined in claim 3, wherein the identifiable feature is visually perceptible.

5. The learning apparatus as defined in claim 3, wherein the identifiable feature is tactilely perceptible.

6. A braille learning apparatus for use with a computer having a keyboard port comprising:

a housing;

a grid board having a card-receiving surface with a multiplicity of discrete pairs of electrically conducting contacts;

a removable card having a periphery mating with that of the card-receiving surface and having a front and a back surface, said card having
 a pattern of braille dots embossed upon its front surface,
 means for tactilely identifying a preselected orientation of the card for positioning the card in mating contact with the card-receiving surface, and
 a pair of electrically connected conducting contacts protruding from its back surface at preselected positions corresponding to the positions of a selected one of the discrete pairs of the electrically conducting contacts on the card-receiving surface of the grid board such that if the card is positioned with back surface of the card in mating contact with the card-receiving surface in the preselected orientation the selected pair of electrically conducting contacts on the card-receiving surface of the grid board will be electrically connected together;

means for mounting the grid board to the housing so that the card may be placed, on the basis of tactile information only, upon the grid board with the back surface of the card in mating contact with the card-receiving surface in the preselected orientation;

a keyboard encoder mounted in the housing, said keyboard encoder having an output port for connection by cable of the keyboard encoder to the keyboard port of the computer and said keyboard encoder electrically connected to the grid board contacts so as to output a keystroke signal in response to electrical connection together of a pair of grid board contacts, said keystroke signal determined by location of the pair electrically connected contacts; and at least one switch electrically connected to the keyboard encoder so that the keyboard encoder outputs a discrete keystroke signal in response to the operation of each switch.

7. The braille learning apparatus as defined in claim 6 for use with a computer capable of visual display of graphics under program control, additionally comprising software for operating the computer so that the computer displays a preselected graphic representation of the pattern of braille dots embossed upon the card corresponding to each discrete keystroke signal received at the keyboard port.

8. The braille learning apparatus as defined in claim 6 for use with a computer capable of sound generation under program control and capable of visual display of graphics under program control, additionally comprising software for operating the computer so that the computer generates a preselected sound and displays a preselected graphic representation of the pattern of braille dots embossed upon the card corresponding to each discrete keystroke signal received at the keyboard port.

9. The braille learning apparatus as defined in claim 8, wherein the software is loaded and run in response to at least one keystroke signal produced by keyboard encoder in response to the operation of at least one switch.

10. The braille learning apparatus as defined in claim 9, wherein the sound pattern generated by the computer is selected to be the spoken equivalent of the pattern of braille dots on the card.

11. The braille learning apparatus as defined in claim 10, wherein the spoken equivalent of the pattern of braille dots on the card is generated from digitized recorded human speech.

12. The braille learning apparatus as defined in claim 8, wherein
 (a) the keyboard encoder has an input header with a multiplicity of column input pins and a multiplicity of row input pins, whereby when a column input pin is electrically connected to a row input pin said keyboard encoder outputs a keystroke signal uniquely determined by the particular column and row input pins electrically connected, and
 (b) the keyboard encoder is electrically connected to grid board by a ribbon cable electrically connecting the input pins of the input header of the keyboard encoder to the electrically conducting contacts of the grid board such that one contact of each discrete pair of the electrically conducting contacts of the grid board is connected to a selected column input pin and the other contact is connected to a selected row input pin, said row and column input pins selected so that the combination of row and column input pins is unique for each discrete pair of electrically conducting contacts of the grid board.

13. The braille learning apparatus as defined in claim 12, wherein the sound generated by the computer is selected to be the spoken equivalent of the pattern of braille dots on the card.

14. The braille learning apparatus as defined in claim 13 for use with a computer capable of visual display of graphics under program control, additionally comprising software for operating the computer so that the computer displays a preselected graphic representation of the pattern of braille dots embossed upon the card corresponding to each discrete keystroke signal received at the keyboard port.

15. The braille learning apparatus as defined in claim 14, wherein the software is loaded and run in response to at least one keystroke signal produced by keyboard encoder in response to the operation of at least one switch.

16. A braille learning apparatus for use with a computer having a keyboard port, comprising:

a housing;

a card-receiving means having a multiplicity of discrete spaced apart electrically conducting contacts;

a removable card having a front surface, said card having an embossed pattern of braille dots and a tactilely perceptible design upon its front surface, a mating portion of the card for contacting the contacts of the card-receiving means, means for tactilely identifying a preselected orientation of the card so that the card may be positioned with the mating portion of the card in contact with the contacts of the card-receiving means, and a pair of electrically connected conducting contacts at preselected positions of the mating portion of the card, said pair of contacts corresponding to the positions of a selected pair of the electrically conducting contacts of the card-receiving means such that if the mating portion of the card is positioned in contact with the contacts of the card-receiving means in the preselected orientation the selected pair of electrically conducting contacts of the card-receiving means will be electrically connected together;

means for mounting the card-receiving means to the housing so that the mating portion of the card may be positioned, on the basis of tactile information only, in contact with the card-receiving means in the preselected orientation; and a keyboard encoder mounted in the housing, said keyboard encoder having an output port for connection by cable of the keyboard encoder to the keyboard port of the computer and said keyboard encoder electrically connected to the contacts of the card-receiving means so as to output a keystroke signal in response to electrical connection together of a pair of the contacts of the card-receiving means, said keystroke signal determined by location of the pair of electrically connected contacts.

17. The braille learning apparatus as defined in claim 16 for use with a computer capable of sound generation under program control, additionally comprising software for operating the computer so that the computer generates a discrete sound pattern for each discrete keystroke signal received at the keyboard port, whereby the sound pattern is produced by placement of the card in mating contact with the card-receiving surface in the preselected orientation.

18. The braille learning apparatus as defined in claim 17, additionally comprising at least one switch electrically connected to the keyboard encoder so that the keyboard encoder outputs a discrete keystroke signal in response to the operation of each switch, wherein the software is loaded and run in response to at least one keystroke signal produced by keyboard encoder in response to the operation of at least one switch.

19. A set of cards comprising a plurality of individual cards, each individual card comprising a card having a pattern upon a surface of the card and two electrically connected contacts at a unique set of discrete spaced positions on the card, with a preselected correspondence between the pattern upon the surface of the card and the selected positions of the contacts, said set of cards for use in an apparatus, said apparatus having a data store for storing data representing the correspondences between the pattern upon the surface and the positions of the contacts on each individual card, a position sensor for sensing the positions of the contacts on a card, and a sound generator for producing a distinct sound in response to the positions of the contacts on a card based upon the stored data representing the correspondences, each said distinct sound being uniquely correlated with a selected one set of the positions of the contacts.

20. The set of cards as defined in claim 19, wherein each pattern is comprised of a visually perceptible pattern.

21. The set of cards as defined in claim 19, wherein the pattern is comprised of a tactilely perceptible pattern.

22. The set of cards as defined in claim 21, wherein the pattern is comprised of an embossed pattern of braille dots.

23. A learning apparatus comprising:

a grid board having a card-receiving surface with a multiplicity of discrete pairs of electrically conducting contacts;

at least one removable card, each removable card having a front surface having a discrete identifiable feature, an positioning feature for identifying a preselected orientation of the card for positioning the card in mating contact with the card-receiving surface, and a back surface having a pair of electrically connected conducting contacts protruding therefrom at preselected positions corresponding to the positions of a selected one of the discrete pairs of the electrically conducting contacts on the card-receiving surface of the grid board such that if the card is positioned with the back surface of the card in mating contact with the card-receiving surface in the preselected orientation the selected pair of electrically conducting contacts on the card-receiving surface of the grid board will be electrically connected together; and a sounds generator connected to the grid board contacts, which sounds generator, in response to the electrical connection together of a discrete pair of grid board contacts, generates at least one preselected sound, whereby the preselected sound is generated if the card is placed in mating contact with the card-receiving surface in the preselected orientation.

24. The learning apparatus as defined in claim 23, wherein the identifiable feature is visually perceptible.

25. The learning apparatus as defined in claim 23, wherein the identifiable feature is tactilely perceptible.

26. The learning apparatus as defined in claim 25, wherein the identifiable feature comprises an embossed pattern of braille dots.

27. The learning apparatus as defined in claim 26, wherein the sound generated is selected to be the spoken equivalent of the pattern of braille dots on the card.

* * * * *